April 22, 1924.
D. CONLAN, JR
1,491,519
ELECTRICAL APPARATUS
Filed Dec. 31, 1920    3 Sheets-Sheet 1
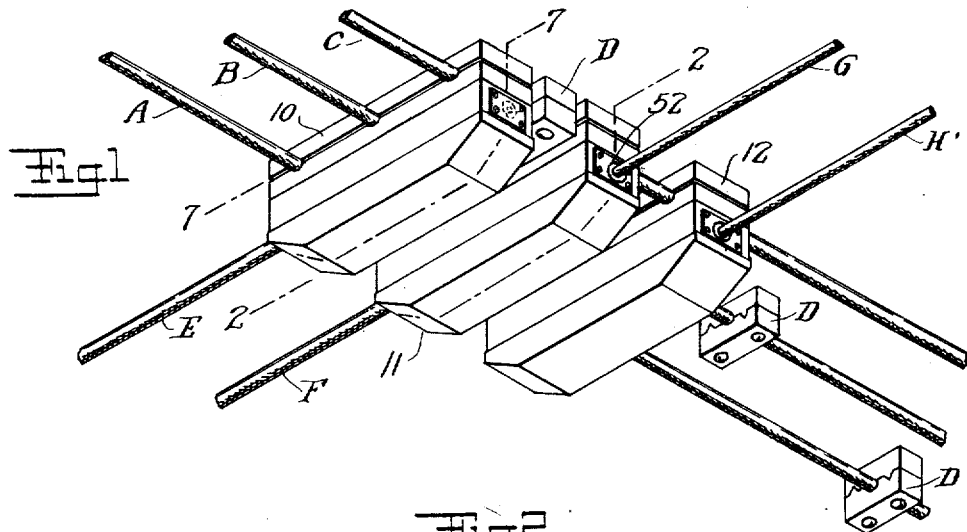
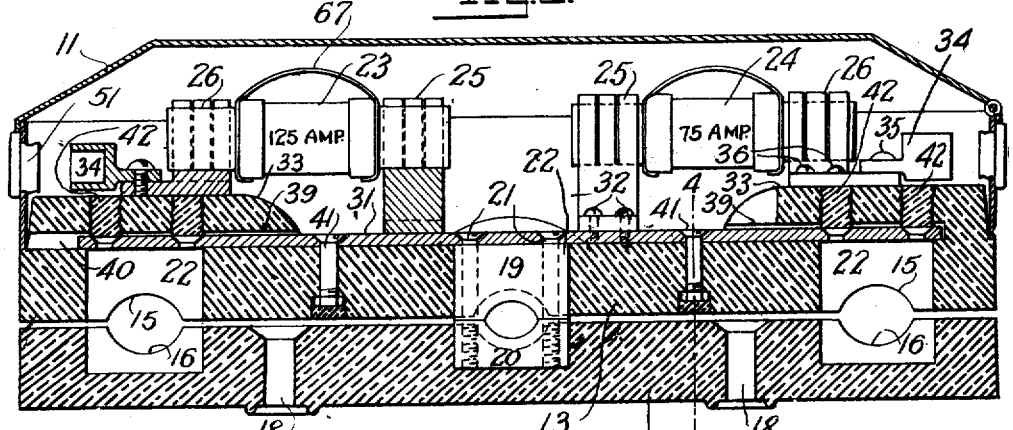
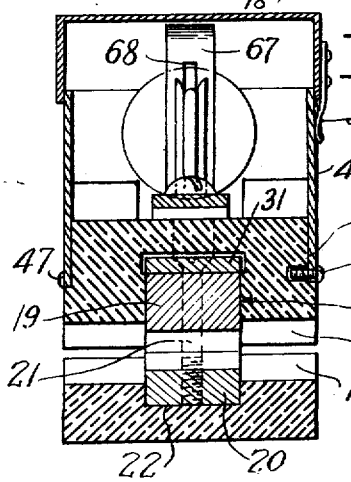
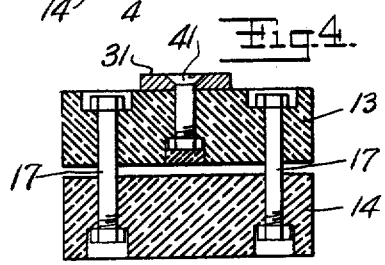
Inventor
David Conlan, Jr.
By his Attorney
Philip S. McLean April 22, 1924.  
D. CONLAN, JR  
ELECTRICAL APPARATUS  
Filed Dec. 31, 1920  
1,491,519  
3 Sheets-Sheet 2
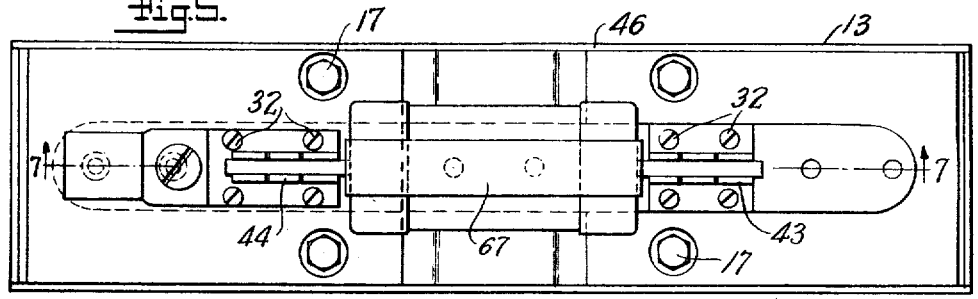
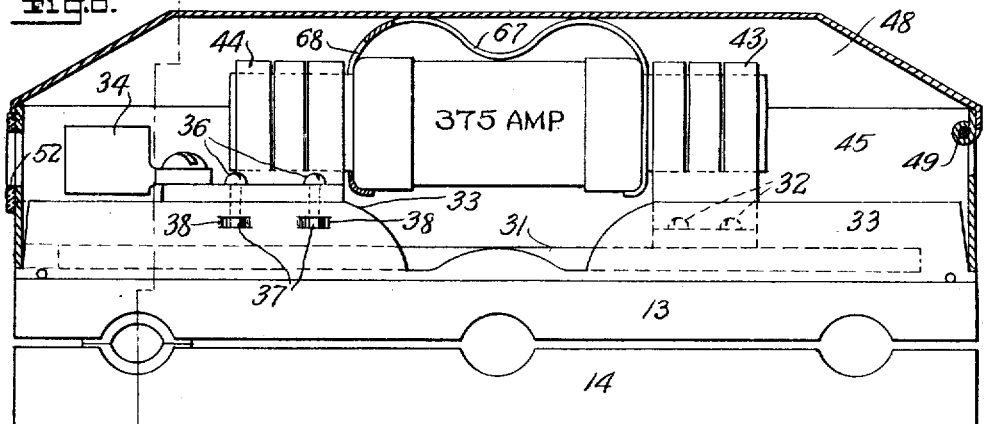
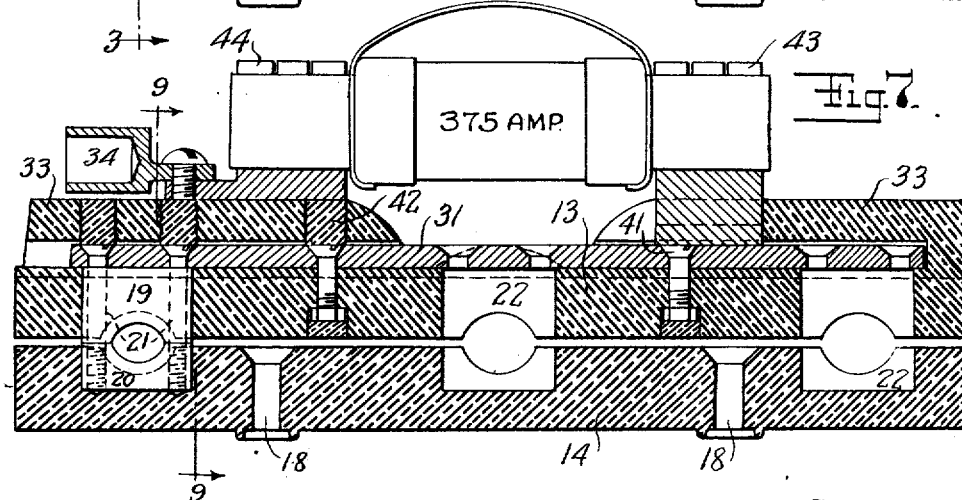
Inventor  
David Conlan, Jr.  
By his Attorney  
Philip S. McFean April 22, 1924.
D. CONLAN, JR
1,491,519
ELECTRICAL APPARATUS
Filed Dec. 31, 1920      3 Sheets-Sheet 3
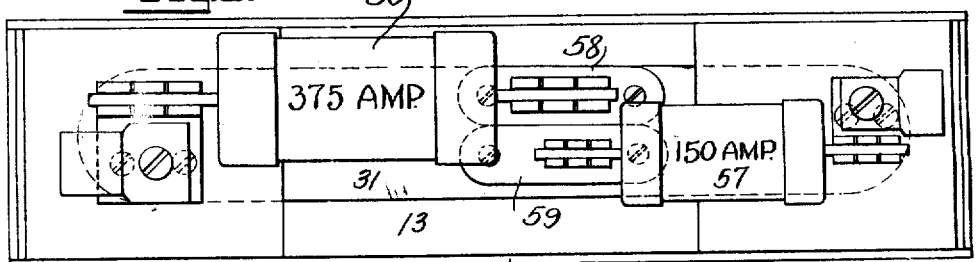
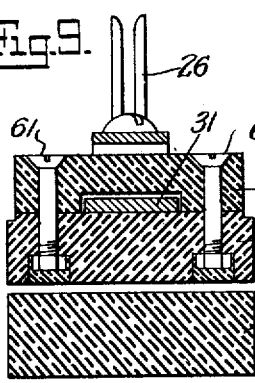
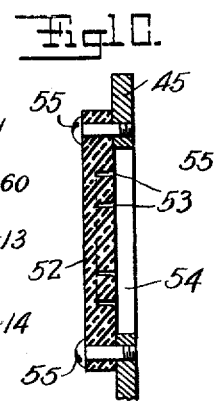
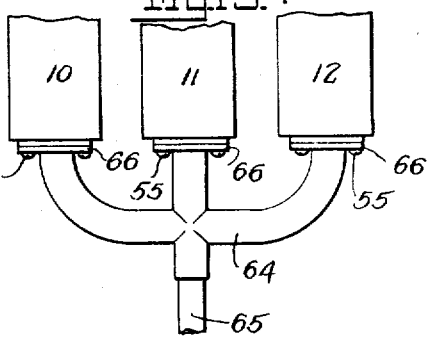
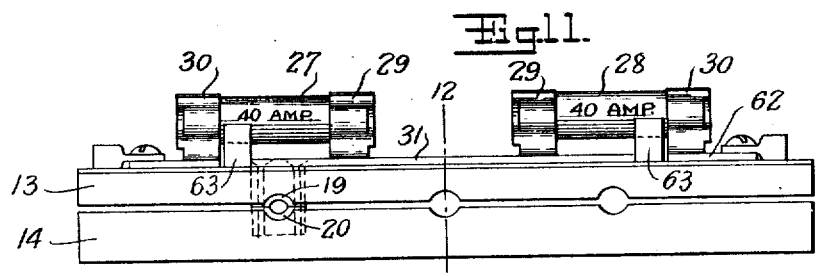
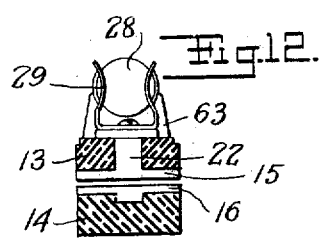
Inventor
David Conlan, Jr.
By his Attorney
Philip S. McLean.

Patented Apr. 22, 1924.

1,491,519

UNITED STATES PATENT OFFICE.

DAVID CONLAN, JR., OF BROOKLYN, NEW YORK.

ELECTRICAL APPARATUS.

Application filed December 31, 1920. Serial No. 434,239.

*To all whom it may concern:*

Be it known that I, DAVID CONLAN, Jr., a citizen of the United States, and a resident of Brooklyn, Kings County, and State of New York, have invented certain new and useful Improvements in Electrical Apparatus, of which the following is a specification.

This invention relates to apparatus for establishing branch connections with the mains of a feeder circuit.

Heretofore the practice has been either to connect the branch wires directly with the feeder wires and to run the branch wires through a cut-out box or boxes; or to run the feed wires into a cut-out box and extend the branch circuit or circuits from bus bars to which the feed wires are connected. The first method is objectionable particularly in that the branch wires are usually connected with the feeders by soldered and taped joints which depend for their efficiency upon the skill and conscience of the wireman, providing weak points in the insulation of the system and because certain of the branch wires are obliged to cross certain of the feeder wires to reach the wires with which they are electrically connected, these crossed wires being always an incipient source of danger.

The second method involves a cutting of the feeder circuit and the interposition of a heavy and expensive cut-out box containing bus bars and terminals for both the feeder and branch circuits.

The objects of my invention are to avoid the objectionable features and faults of the methods and means heretofore employed and to provide relatively simple, inexpensive and easily installed apparatus for directly establishing fused branch connections with a feeder circuit wherever required, and which, without being cumbersome or unsightly will be strong and efficient both from an electrical and a mechanical point of view.

One of the distinctive features of my invention is the provision of special cut-outs which are directly applied to the wires of the feeder circuit, in the nature of cleats and which carry branch terminals, fuses connected with the branch terminals and connecting-in devices in circuit with the fuses and interchangeably engageable with selected wires of the feeder circuit.

Various other features of the invention will appear as the specification proceeds.

In the drawings accompanying and forming a part of this specification I have illustrated the invention embodied in practical forms, but as such illustration is primarily for purposes of disclosure, I wish it understood that the structure may be modified in various respects without departure from the true spirit and scope of the invention as hereinafter defined and claimed.

In the drawings referred to, Figure 1 is a broken perspective view illustrating an adaptation of the invention to provide two reversely extending 2-wire branches from a 3-wire feeder circuit.

Figure 2 is a substantially central longitudinal sectional view of the intermediate or double branch cut-out device, on the plane of line 2—2 of Figure 1.

Figure 3 is a transverse sectional view of one of the devices, taken on substantially the plane of line 3—3 of Figure 6.

Figure 4 is another transverse sectional view as on substantially the plane of line 4—4 of Figure 2.

Figure 5 is a top plan view of one of the single branch cut-out devices, with the cover removed.

Figure 6 is a side elevation of the same with the cover portion shown in section.

Figure 7 is a longitudinal sectional view of the same on substantially the plane of line 7—7 of Figure 1.

Figure 8 is a plan view of a heavy amperage type of double branch connection.

Figure 9 is a cross sectional view of a slightly modified construction taken on substantially the plane of line 9—9 of Figure 7.

Figure 10 is a fragmentary sectional view of a combined insulating closure and knock-out plate.

Figure 11 is a side elevation of another form of double branch device.

Figure 12 is a cross sectional view of the same on substantially the plane of line 12—12 of Figure 11.

Figure 13 is a broken plan view illustrating a method of connecting the outlet devices with a conduit system.

In the case shown in Figure 1, A, B and C designate the conductors of a 3-wire feeder circuit, said wires being supported in the usual way by cleats D located in accordance with the particular exigencies of the situation as regards supporting columns, beams, etc., to provide the best support for the feeders.

E and F designate the conductors of a branch circuit of relatively high current-carrying capacity extending from the feeder circuit in one direction and similarly G and H indicate the conductors of a branch circuit of lesser amperage extending from the feeders in the reverse direction.

The branch E—F is supplied from the cut-out 10 and from one end of the cut-out 11 and the branch G—H is supplied from the cut-out 12 and the opposite end of the cut-out 11.

Each of these cut-out devices consists of a cleat-like structure involving cooperating base parts 13 and 14 provided with opposed notches 15, 16 forming seats receiving the conductors of the feeder circuit.

These base parts are secured together by suitable fastenings such as the screw bolts 17 (Figure 4) so as to clamp the feeder wires therebetween and thus hold the same in definite spaced relation and at the same time secure the device as a whole in supported engagement on the feeders. As the feeders are usually stretched taut and rigidly supported, they may constitute the sole means for supporting the cut-outs, but where the adjoining structure permits, I find it usually advisable to pass suitable securing devices, such as screw bolts, through passages 18 provided in the under or lower base member 14, into the adjoining wall or other support of the feeders.

Each of the cut-out devices is provided, in this illustration, with means for enabling the same to be connected in circuit with any selected one of the three feeder wires. This connecting means is shown in the form of a two-part clamp consisting of cooperating clamp elements 19, 20 designed to receive between them the bared portion of the feeder and held together in clamping engagement upon the feeder by screws 21. This clamp is interchangeably engageable in any one of the three seats 22 provided between the base parts and here shown formed in line with the cable clamping portions 15, 16 and as rectangular in shape to accommodate the correspondingly shaped clamp.

In Figure 2 the connecting-in clamp of this double branch fixture is shown as seated in the central or intermediate pocket so as to provide a circuit connection with the intermediate or so-called "middle" wire B of the feeder circuit, whereas in Figure 7 the clamp is seated in the pocket at the left hand end of the device to establish connection with the feeder wire A.

Where fused branch connections are to be extended in both directions, a structure like that shown more particularly in Figure 2 may be employed, involving two fuses 23 and 24, one for each branch. Suitable terminals for the fuses are provided, the form of terminal depending on the type of the fuse. In the first forms of the invention, where the fuses are shown of the "knife blade" type, the terminals are constructed as clips 25, 26 to receive the knife blade contacts of the fuses.

Where "ferrule" type fuses are used, as indicated at 27, 28 in Figure 11, the clips 29, 30 will be correspondingly shaped to receive the cylindrical ferrule terminals of the fuses. From these illustrations it will be apparent that other styles of terminal may be used, depending on the nature of the fuse.

Reverting to Figure 2, the fuses are connected in circuit by securing the inner set of clips 25 to a conductor bar 31 as by means of screws 32 passed through the base portions of the clips into engagement with screw seats provided in the conductor bar, this bar overlying the clamp seats 22 and having the connection clamp directly secured thereto by means of the screws 21 previously referred to.

The other or outer set of clips 26 are insulated from the conductor bar by being mounted on insulating seats 33 and the branch terminal lugs 34 are shown as directly secured to the base portions of these clips by means of screws 35. In Figure 6 I have shown how the screws 36 which secure the insulated clips in place may extend down through the insulating support into engagement with nuts 37 set in seats 38 provided in the side of the insulating base 33.

The seats for the insulated fuse clips overstand the ends of the bus bar 31, channels 39 being shown provided to receive the bus bar and one of these channels (the one at the left in Figure 2) is shown as open at the outer end of the base member at 40 to enable the bus bar being slipped endwise into position overlying the clamp seats. When thus positioned on the upper base member, the bus bar may be fixedly secured in place as by means of fastening screws 41 extended down through the bus bar into engageent with nuts embedded in the base member.

When connection is to be made with one of the outer wires of the circuit and the clamp is therefore seated in the pocket 22 at one end of the base, access is had to the clamp securing screws 21 through holes provided down through the top of the clip supporting seat 33 and which holes may normally be closed by means of the insulating screw plugs indicated at 42.

Where a one-way fused branch connection is to be made and only a single fuse is necessary, but two fuse clips are needed, as indicated at 43, 44 in Figures 5, 6 and 7, the first of these being directly fastened to the bus bar and the second being supported in insulated relation removed from the bus bar. In this last mentioned view I have shown how the bus bars may be made heavier or thicker for greater current capacity and the parts are preferably interchangeably constructed so that different bus bars and fuse clips may be substituted as found necessary to meet various current distributing requirements. This interchangeability is made possible by constructing the bases to receive bus bars of different thickness and by drilling all the bars to receive the various securing screws described.

In making a fused branch connection with my invention it will be seen that it is merely necessary to remove sufficient insulation from the feeder with which connection is to be made, to receive the clamp and to then apply the two parts of the cleat base over the wires, with the clamp parts located in the proper seat to engage with the selected conductor. Then when the clamp is set up on the bared portion of the wire and the cleat parts are secured together, the bus bar, with its associated fuse clip or clips will be connected in circuit and the device as a whole will be secured in supported relation on the circuit wires, the wires further being then all gripped and rigidly held in properly spaced relation, making it an easy matter to thereupon secure the branch lead or leads to the out-going fuse clip or clips. Where fastenings are used for securing the base to the adjoining ceiling or other supporting structure, such fastenings may be passed through the openings 18 provided in the inner base member 14 before applying the other parts thereto.

It will be evident that the construction disclosed enables the establishment of these fused branch connections at the most convenient points, for instance, at locations nearest the points where current is to be taken off for motors and the like. In Figure 1 I have shown, for example, how the connections with the several feed wires may be arranged at different sides of the cleats which support the feed wires. This independence of the several connecting-in devices also permits them being spaced differently as on opposite sides of a bar or other structural unit which may stand in the way. The fuses for the different branches are independent and accordingly may be of any desired capacity suited to carrying the load intended for a particular branch, the clips and bus bars being designed to take care of such loads.

To protect the fuses from dust and dampness I have shown the same as encased in a box-like structure 45 secured over a shouldered portion 46 of the outer base member as by means of screws 47 and having a cover 48 hinged thereto at 49 and yieldingly held by spring catches 50 (Figure 3).

The branch wires may be led out of the box through suitable insulating eyelets such as I have indicated at 51 (Figure 2) or insulating guide plates 52 as shown in Figures 1 and 6 and more particularly in Figure 10. In this latter view the guide plate has a series of concentric and relatively deep groves 53 cut in the inner face of the same providing for "knock-outs" to accommodate cables of different size. These plates serve normally as closures to openings 54 in the ends of the box and when an outlet is necessary, this is provided for by simply working a knife in one of the concentric grooves 53. The screws 55 by which these plates are secured in place, enable easy removal of the plates when an outlet opening is to be provided therein.

Where the fuses are relatively short they may be arranged in end to end relation, as in Figures 2 and 11, but where large size fuses are necessary they may be offset or staggered as I have shown in Figure 8. In this illustration the two fuses 56, 57 are offset at opposite sides of a common center line so as to bring the center or intermediate clips 58, 59 alongside each other. Also in this view I have shown how the branch terminals may be located at the sides of the end fuse clips to save space longitudinally.

While in many cases it is preferable to have the seat 33 for the outer fuse clips formed integrally with the upper base member, there are instances when it is better to have this seat formed as a separate element which can be secured over the top of the bus bar. I have illustrated such a construction in Figure 9, wherein it will be seen that the support for the fuse clip is formed as a separate base 60 of insulating material secured in position on the upper base part 13 by screws 61.

The structure shown in Figures 11 and 12, aside from the different style of fuse clips differs from the constructions first disclosed in that the outer fuse clips 30 are secured to the branch terminals 62 on a level with the inner fuse clips and separated therefrom and from the ends of the bus bar by upstanding barriers 63 of insulating material.

In Figure 13 I have shown how the connecting-in devices may be coupled directly to the piping of a conduit system by providing a forked conduit member 64 having a neck directly secured to the piping 65 of the conduit system and having plates 66 at the ends of its several branches directly secured to the ends of the boxes in place of the closure plates 52 and secured by the same screws 55 which were used to hold the closure plates in position.

To enable ready removal of the fuses I prefer to provide a handle device of novel construction and shown particularly in Figures 2 and 6 as consisting of a strip of sheet insulation 67 having slotted ends 68 slipped over the knife blade terminals of the fuses, the intermediate portions of these strips standing out as handles adapted to be grasped by the fingers of the operator.

The invention, it will be seen, may be used with two, three, four or any other arrangement of wiring systems and may be modified in various ways to meet different specific requirements. I therefore wish it understood that the terms which I have used herein are employed in a descriptive rather than in a limiting sense, except for such limitations as may be required by the prior art.

What I claim is:

1. In electrical apparatus of the character disclosed, a cleat-like base comprising co-operating base members constructed to receive between them the conductors of a feeder circuit, fuse terminals on the base, a branch terminal electrically connected with one of said fuse terminals and means for selectively and interchangeably connecting the other of the fuse terminals with either of the conductors of the feeder circuit.

2. In electrical apparatus of the character disclosed, a cleat-like base comprising co-operating base members constructed to receive between them the conductors of a feeder circuit, fuse terminals on the base, a branch terminal electrically connected with one of said fuse terminals, means for interchangeably connecting the other of the fuse terminals with either of the conductors of the feeder circuit, said means including a bus bar with which the last mentioned fuse terminal is electrically connected, a clamp engageable with a bared portion of either the feed conductors and means for securing said clamp to the bus bar when so engaged with the selected conductor.

3. In electrical apparatus of the character disclosed, a cleat-like base engageable over the conductors of a feeder circuit without interrupting continuity of the same, a connecting-in device interchangeably supportable on said base to make electrical engagement with different selected continuous conductors of the feeder circuit, a fuse terminal, means for electrically connecting said fuse terminal with the connecting-in device in any of its different positions on the base, a second fuse terminal on the base insulated from the first and a branch circuit terminal electrically connected with the insulated fuse terminal.

4. Apparatus for directly establishing fused branch connections with the mains of a feeder circuit without interrupting continuity of the same comprising separate and independently adjustable cleat-like bases, one for each of the mains and each consisting of separable base parts engageable over opposite sides of a main and provided with means for clamping the same therebetween, a tap carried by each of said cleat-like bases and directly engageable with the feeder to which the device is applied, a branch terminal carried by the base and means on the base for connecting in a fuse between said branch terminal and the tap aforesaid.

5. In electrical apparatus of the character disclosed, a cleat-like base engageable over the conductors of a feeder circuit, a connecting-in device interchangeably supportable on said base to make electrical engagement with different conductors of the feeder circuit, a fuse terminal, means for electrically connecting said fuse terminal with the connecting-in device in any of its different positions on the base, a second fuse terminal on the base insulated from the first, a branch circuit terminal electrically connected with the insulated fuse terminal, a casing on the base enclosing the fuse terminal and consisting of a box structure secured on the base and a cover hinged to said box structure.

6. In electrical apparatus of the character disclosed, a cleat-like base engageable over the conductors of a feeder circuit, a connecting-in device interchangeably supportable on said base to make electrical engagement with different conductors of the feeder circuit, a fuse terminal, means for electrically connecting said fuse terminal with the connecting-in device in any of its different position on the base, a second fuse terminal on the base insulated from the first, a branch circuit terminal electrically connected with the insulated fuse terminal, a casing on the base enclosing the fuse terminals and means for directly connecting said casing with a conduit system.

7. In electrical apparatus of the character disclosed, a cleat-like base engageable over the conductors of a feeder circuit, a connecting-in device interchangeably supportable on said base to make electrical engagement with different conductors of the feeder circuit, a fuse terminal, means for electrically connecting said fuse terminal with the connecting-in device in any of its different positions on the base, a second fuse terminal on the base insulated from the first, a branch circuit terminal electrically connected with the insulated fuse terminal and a casing on the base enclosing the fuse terminals, said casing having a removable insulating end closure provided with concentric depressions therein.

8. In electrical apparatus of the character disclosed, a cleat-like base engageable over the conductors of a feeder circuit, a connecting-in device interchangeably supportable on said base to make electrical engagement with different conductors of the feeder circuit, a fuse terminal, means for electrically connecting said fuse terminal with the connecting-in device in any of its different positions on the base, a second fuse terminal on the base insulated from the first, a branch circuit terminal electrically connected with the insulated fuse terminal, a casing on the base enclosing the fuse terminals, said casing having a removable insulating end closure provided with concentric depressions therein, means for detachably securing said end closure and a conduit terminal fitting interchangeable with said insulating end closure and adapted to be held by the same securing means.

9. In electrical apparatus of the character disclosed, a cleat-like base engageable over the conductors of a feeder circuit, a connecting-in device interchangeably supportable on said base to make electrical engagement with different conductors of the feeder circuit, a fuse terminal, means for electrically connecting said fuse terminal with the connecting-in device in any of its different positions on the base, a second fuse terminal on the base insulated from the first, a branch circuit terminal electrically connected with the insulated fuse terminal, said fuse terminals being in the form of clips to receive the ends of a knife blade fuse and a strap of insulating material having slotted ends to fit over the knife blade terminals of a fuse engaged with said clips.

10. In electrical apparatus of the character described, a cleat-like base engageable over the conductors of a feeder circuit, a conducting clamp on said base and interchangeably engageable with the different conductors of the feeder circuit held in the cleat-like base, two pairs of fuse clips mounted on the base, branch terminals at opposite ends of the base and connected with two of the fuse clips and means connecting the other fuse clips with the interchangeable clamp.

11. In electrical apparatus of the character disclosed, cooperating base members provided with registering recesses to receive the insulated conductors of a feeder circuit in their normally spaced relation and with seats in line with said recesses, means for securing said base members together over the conductors, a conductor clamp interchangeably engageable in any one of said seats, a bus bar extending over the several seats, means for electrically connecting the clamp in any one of said seats with said bus bar, a fuse terminal electrically connected with the bus bar and a companion fuse terminal electrically insulated from the bus bar and provided with means for the attachment of the conductor of a branch circuit.

12. In electrical apparatus of the character disclosed, cooperating base members provided with registering recesses to receive the insulated conductors of a feeder circuit in their normally spaced relation and with seats in line with said recesses, means for securing said base members together over the conductors, a conductor clamp interchangeably engageable in any one of said seats, a bus bar extending over the several seats, means for electrically connecting the clamp in any one of said seats with said bus bar, a fuse terminal electrically connected with the bus bar, a companion fuse terminal electrically insulated from the bus bar and provided with means for the attachment of the conductor of a branch circuit and an insulating seat for the insulated fuse terminal overstanding the bus bar.

13. In electrical apparatus of the character disclosed, cooperating base members provided with registering recesses to receive the insulated conductors of a feeder circuit in their normally spaced relation and with seats in line with said recesses, means for securing said base members together over the conductors, a conductor clamp interchangeably engageable in any one of said seats, a bus bar extending over the several seats, means for electrically connecting the clamp in any one of said seats with said bus bar, a fuse terminal electrically connected with the bus bar, a companion fuse terminal electrically insulated from the bus bar and provided with means for the attachment of the conductor of a branch circuit and an insulating seat for the insulated fuse terminal overstanding the bus bar and detachably secured over the base member to which it is applied.

14. In electrical apparatus of the character described, a cleat-like base engageable over the conductors of a feeder circuit, provided with recesses to receive said conductors and with seats in line with said recesses to receive a connecting clamp, a connecting-in clamp adapted to engage a bared portion of a conductor engaged in one of the conductor recesses and interchangeably engageable in either of the seats aforesaid, a bus bar on the base, means for securing the connecting-in clamp to said bus bar in either of its locations in the seats aforesaid, a fuse terminal electrically connected with the bus bar, an insulating support on the base adjacent one end of the bus bar, a fuse terminal mounted on said insulating support and a branch terminal on said support electrically connected with said second fuse terminal.

15. Apparatus for directly establishing interruptible branch connections with the mains of a feeder circuit without interrupting continuity of the same, comprising cleat-like bases, one for each of the mains and each consisting of a two-part separable base applicable over opposite sides of a main and provided with means for clamping the same therebetween, a tap mounted on said base and adapted for clamping engagement with the main, a branch terminal supported on the base and a circuit interrupter supported on the base and electrically connected with said branch terminal and the tap aforesaid.

16. In apparatus of the character disclosed, a separable two-part cleat base engageable over the mains of a feeder circuit and provided with means for clamping it in position thereon, said base having an insulating seat and an open passage beneath the same, a conductor bar entered through said open passage and a feeder clamp mounted on the base and provided with means for electrically connecting the same with the conductor bar.

In witness whereof, I have hereunto set my hand this 27th day of December, 1920.

DAVID CONLAN, Jr.